Nov. 22, 1966     M. H. PETERSON     3,286,660
HAY WAFERING APPARATUS

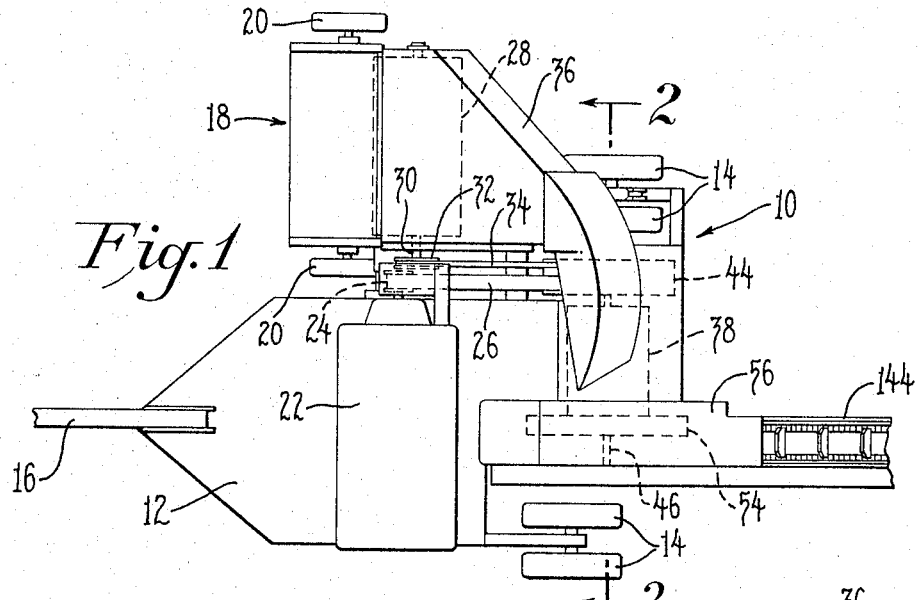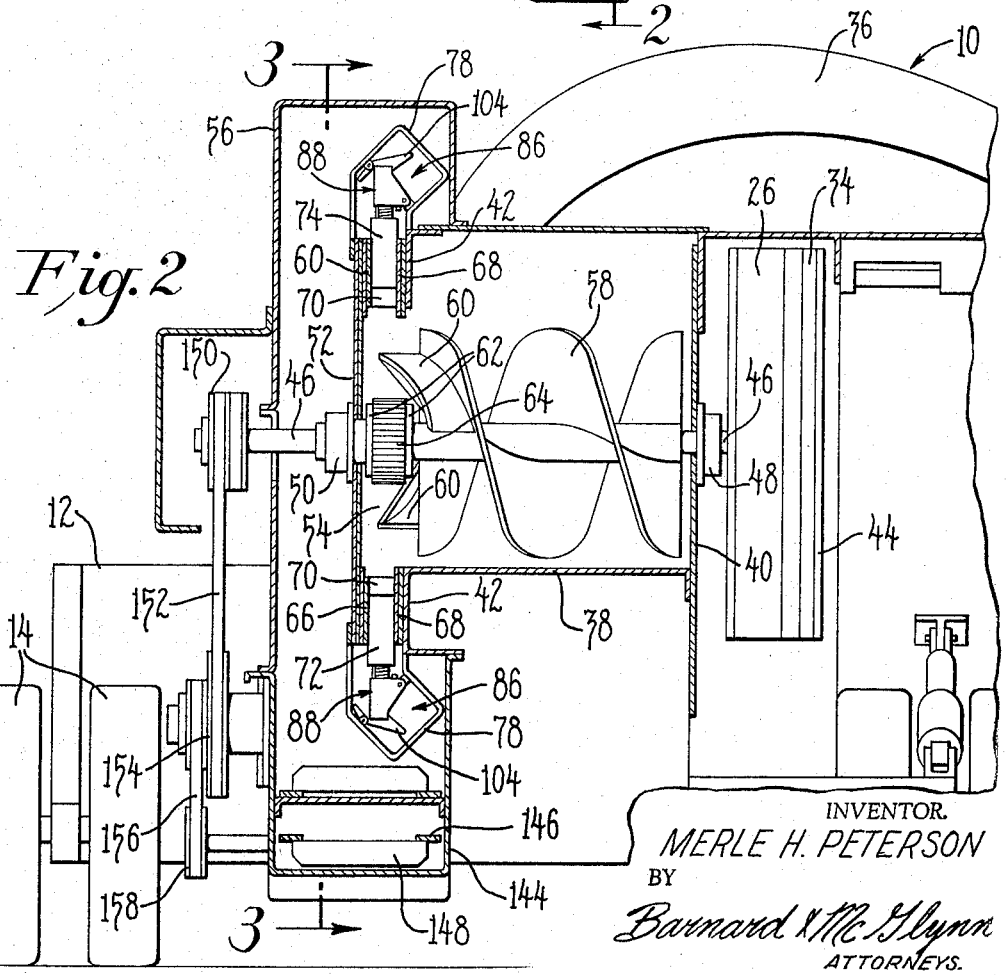

Filed May 14, 1962     3 Sheets-Sheet 2

INVENTOR.
MERLE H. PETERSON
BY
Barnard & McGlynn
ATTORNEYS.

INVENTOR.
MERLE H. PETERSON
BY
Barnard & McGlynn
ATTORNEYS.

United States Patent Office

3,286,660
Patented Nov. 22, 1966

3,286,660
HAY WAFERING APPARATUS
Merle H. Peterson, Livonia, Mich., assignor to Massey-Ferguson, Inc., Detroit, Mich., a corporation of Maryland
Filed May 14, 1962, Ser. No. 194,398
4 Claims. (Cl. 107—14)

This invention relates to an apparatus for producing hay wafers and, in particular, to an improved apparatus for field wafering forage crops into hay wafers of substantially uniform quality, constituency, length, shape and density for livestock feed.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open radially extending die cells, each of which is of variable converging cross section from its entrance end to its exit end. Hydraulically operated motor assemblies have been associated with opposite movable walls of each of the die cells to control the variable cross section thereof and the degree of compression of an extrusion of hay compressed therethrough. Rotary hay compressing means have been provided within the wafering chamber so as to travel in a rotative path closely spaced from the entrance ends to the die cells, and so that hay received within the wafering chamber will be compressed into and through the die cells upon successive cycles of rotation of the rotary hay compressing means. As a result, as the apparatus moves through a field of mown hay, a continuous extrusion of compressed hay of substantially uniform quality, constituency, shape and density emerges from the exit ends of the respective die cells, and each extrusion is adapted to be engaged by a fixed ejection plate adjacent the exit end of each of the die cells to break the respective extrusions of hay into wafers of substantially uniform length.

In an apparatus of the type aforementioned, the columns or extrusions of hay moving through each of the die cells in response to the compressive force of the rotary hay compressing means is further compressed and compacted by controlling the relative disposition of the opposite movable walls of and, hence, the converging cross section of each of the die cells, thereby requiring the aforementioned hydraulic motor assemblies and various plumbing and control means therefor. Furthermore, the ejection plates aforementioned associated with the exit ends of each of the die cells are relatively impositive in their action; that is, they essentially consist of a portion extending from one side of each die cell to a location extending over the axis of each cell and spaced from the exit end thereof, whereby the compressed extrusion or column of hay emerging from the die cell is gradually bent away from the axis thereof until a compressed wafer breaks from the extrusion or column.

Thus, the present invention contemplates an improved apparatus of the general type aforementioned for making compressed hay wafers, and characterized by means for axially engaging columns of hay emerging from the exit ends of the die cells and being forced therethrough by a rotary hay compressing means at the entrance ends thereof, so as to compress and compact said columns axially upon continued application of force thereto by the hay compressing means. More specifically, the aforementioned means comprises a combined compaction and ejection means associated with the exit end of each of the die cells of the apparatus for engagement with the columns of hay emerging therefrom to axially compress or compact such columns as the aforementioned rotary hay compressing means makes successive passes around the entrance ends of the die cells forcing additional hay into and therethrough, and to automatically successively break compacted or compressed wafers of substantially uniform length from the columns and positively eject such wafers from the die cells. As a result, columns of hay extruded through the respective die cells are effectively axially compressed through the cooperation of the rotary hay compressing means at one end of the die cells and the combined compaction and ejection means at the other ends thereof, the combined ejection and compaction means operating automatically to break successive wafers of substatnially uniform length from a given extrusion and eject such waver positively from the die cells, while eliminating the need for movable die cell walls, hydraulic motor assemblies and a hydraulic control system therefor and improving the ejection action for the compressed wafers.

In order to facilitate an understanding of the invention, a preferred embodiment thereof will now be described with reference to the accompanying drawings in which:

FIGURE 1 is a top plan view of a hay wafering apparatus embodying the invention;

FIGURE 2 is an enlarged fragmentary sectional view taken on line 2—2 of FIGURE 1;

Figures 3, 4:
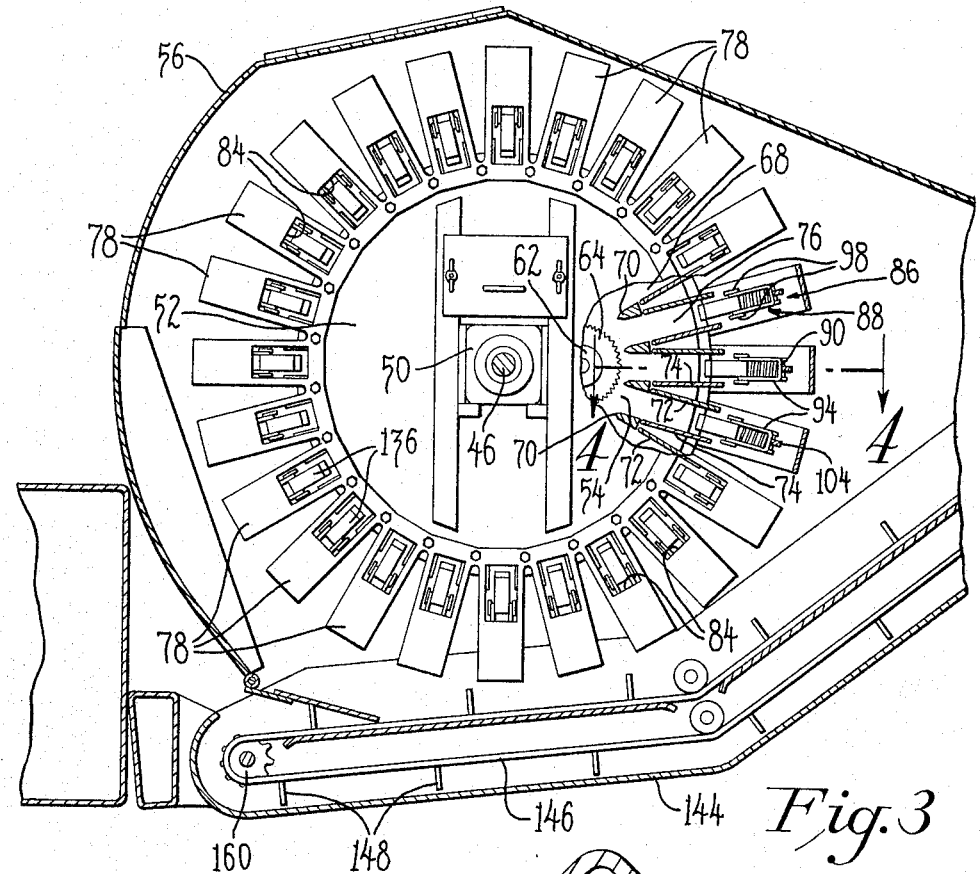
FIGURE 3 is a fragmentary sectional view taken on line 3—3 of FIGURE 2.
FIGURE 4 is an enlarged fragmentary sectional view taken on line 4—4 of FIGURE 3 and illustrating the disposition of the compaction and ejection mechanism of the apparatus when initially engaged with a column of hay emerging from an associated die cell.
Figure 5:
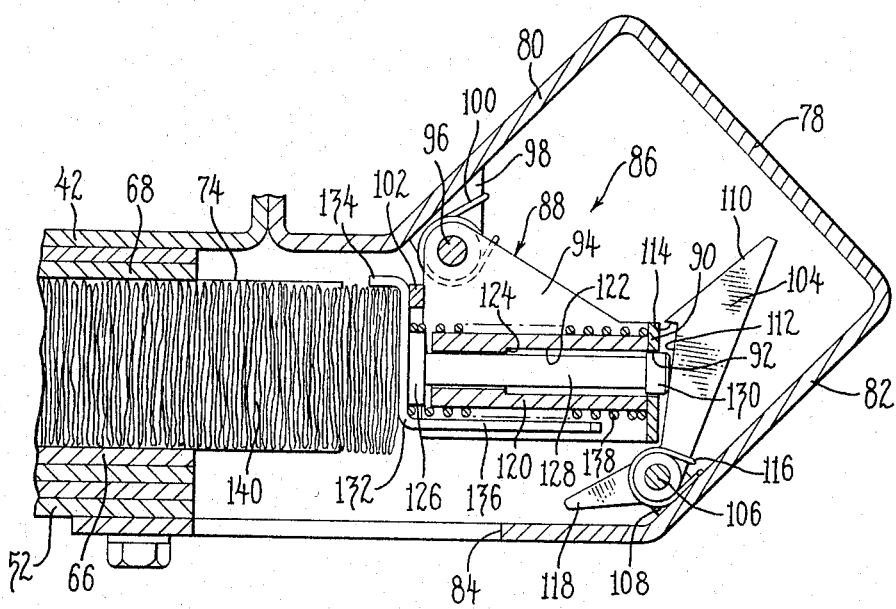
Figure 6:
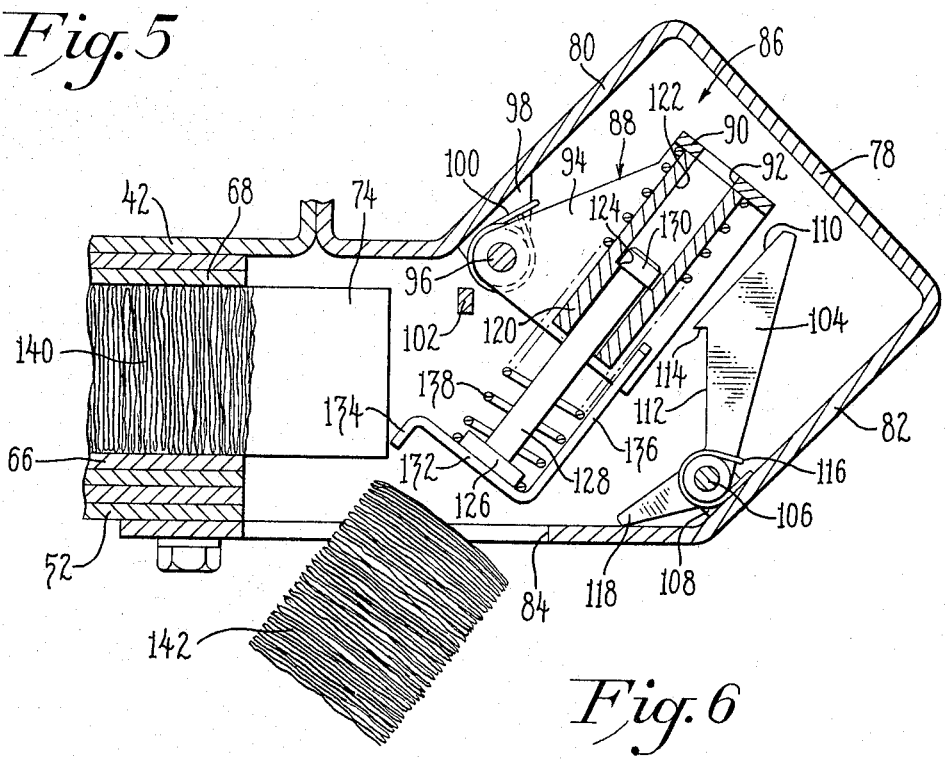

FIGURE 5 is a view corresponding generally to FIGURE 4, but illustrating the disposition of the compaction and ejection mechanism just prior to breaking a wafer of compacted hay from the column and ejecting such wafer; and FIGURE 6 is a view corresponding generally to FIGURES 4 and 5, but illustrating the disposition of the compaction and ejection mechanism in breaking a wafer of compacted hay from the column and ejecting such wafer.

Referring now to the drawings, the numeral 10 in FIGURE 1 generally indicates a hay wafering apparatus comprising a frame 12 equipped with ground-engaging wheel means 14 in the usual manner, and a drawbar 16 adapted to be hitched to a suitable prime mover, such as an agricultural tractor, for drawing the frame along a field of mown hay. A pick-up mechanism for mown hay in the field is indicated generally at 18, is equipped with ground-engaging wheel means 20 in the usual manner and is suitably coupled in a conventional way to the frame of the apparatus so as to be towed with the latter. A suitable power plant or engine 22 is mounted on the frame 12 and includes an output shaft mounting a pulley means 24 entraining belt means 26 to drive various of the instrumentalities of the apparatus as will be pointed out hereinafter.

The apparatus aforedescribed is adapted to be towed along the field of mown or cut hay, preferably with the hay arranged in windrows and having been preconditioned or processed in a known manner so as to consist of finely chopped, mixed and blended stem and leave components forming a substantially homogeneous mass. As the apparatus is towed along the field, the hay mixture in a given windrow is adapted to be picked up in the pick-up mechanism 18 which includes a rotary flail device indicated schematically at 28 and driven by a shaft 30 connected to a pulley 32 driven by belt means 34 from another pulley mechanism driven by the belt means 26 as will be pointed out hereinafter. Being of known construction, it will suffice to point out that the rotary flail device 28 includes a plurality of rapidly rotating flails or arms operable to direct the homogenized hay in an air stream into the delivery chute 36 of the pick-up mechanism which delivers the hay through a suitable opening in the side wall of a horizontally disposed cylindrical hopper 38 suitably secured on the frame 12 and including a closed end wall 40 and an annular open end wall 42 axially opposite thereto.

A large pulley or flywheel 44 is secured to one end of a horizontally disposed drive shaft 46 exteriorly of the hopper adjacent its end wall 40, and is drivingly connected to the power plant or engine 22 by the aforementioned belt means 26 and further transmits engine power to the rotary flail device 28 by the belt means 34 aforedescribed. The drive shaft 46 is rotatably supported in suitable bearing means 48 adjacent the end wall 40 of the hopper and bearing means 50 adjacent a wall member 52 axially opposite the hopper end walls 40 and 42. As appears particularly in FIGURE 2, the drive shaft 46 extends horizontally through the hopper 38, through an annular vertically disposed wafering chamber 54 at one end thereof between the annular hopper end wall 42 and wall member 52 and therebeyond through an enlarged housing member 56 encasing an end of the hopper 38 and the aforementioned wafering chamber 54. A multiple flight feed auger 58 is secured on the drive shaft 46 within the hopper 38 so as to be radially inwardly spaced from the cylindrical side wall thereof, while a pair of arcuate deflector vanes 60 project from one end of the auger into the wafering chamber 54. Radially extending arms 62 have their central portions suitably rigidly secured to the drive shaft 46 for rotation therewith within the wafering chamber 54, and have journaled at the opposite ends thereof a pair of rollers 64 the peripheries of which may be serrated as indicated in FIGURE 3. The deflector vanes 60 are disposed in advance of the path of rotation of the arms 62 and the respective rollers 64 within the wafering chamber for a purpose to appear hereinafter.

The wafering chamber 54 includes oppositely spaced annular end die plates 66 and 68 suitably supported respectively on the periphery of the wall member 52 and the annular end wall 42 at one end of the hopper 38. An annular or circumferentially spaced series of knife edges 70 extend between and are fixed to the end die plates 66 and 68. An annular or circumferentially spaced series of pairs of side die plates 72 and 74 are also fixedly disposed between the end die plates 66 and 68, and diverge from their radially inner ends adjacent a respective knife edge 70 to form an annular or circumferentially spaced series of axially open die cells 76 between end die plates 66 and 68 and respective oppositely spaced and substantially parallel side die plates 72 and 74 of an adjacent pair thereof. As will be apparent, the axes of the respective die cells 76 are contained in a plane perpendicular to the axis of rotation of the drive shaft 46 or a vertical plane with the apparatus traversing a horizontal surface. Furthermore, the cross sections of the die cells are substantially uniform between their entrance ends which communicate with the wafering chamber 54 between adjacent pairs of the knife edges 70 and their exit ends spaced axially therefrom which communicate with the interior of respective ones of an annular or circumferentially spaced series of housing 78 suitably secured to the wall members 42 and 52 of the wafering chamber, and each including oppositely spaced wall members 80 and 82 and an opening 84 in the latter into the large housing member 56 aforedescribed.

As will be apparent particularly from FIGURE 2 and 3, the rollers 64 are positioned so as to be closely spaced to but not engage the knife edges 70 and the entrance ends to the respective die cells 76. Thus, hay fed continuously by the auger 58 from the hopper 38 into the wafering chamber 54 is laid across the knife edges 70 and the entrance ends of the respective die cells by the deflector vanes 60 in advance of the rotative path of the rollers 64 which compress the hay and force it past the knife edges into and through the respective die cells upon successive rotative passes of the rollers.

A compaction and ejection mechanism indicated generally at 86 is contained within each of the housings 78 associated with the exit ends of the respective die cells 76. Each of the compaction and ejection mechanisms comprises a generally U-shaped carriage 88 having a base wall 90 including an opening 92 therethrough, and spaced side walls 94 pivotally connected by pivot pin 96 between spaced ears 98 secured to wall member 80 of the housing 78. Torsion spring means 100 is mounted about the pivot pin 96 and reacts between one of the ears 98 and one side wall 94 of the carriage in the usual manner to continuously urge the latter to the position illustrated in FIGURES 4 and 5 as limited by abutment of one or both carriage side walls with an abutment 102 suitably secured within housing 78, while being yieldable to permit pivotal movement of the carriage counterclockwise to substantially the position illustrated in FIGURE 6. In similar fashion, a latch lever 104 is pivotally connected by pivot pin 106 between spaced ears 108 secured to wall member 82, and comprises an inclined cam surface 110 and a latching surface 112 including dogging notch 114 latchingly engageable with the base wall 90 of the carriage as illustrated in FIGURE 4. Again, torsion spring means 116 surrounds the pivot pin 106 and reacts between the wall member 82 of the housing and the latch lever 104 so as to continuously urge the latter counterclockwise in FIGURES 4 through 6 toward latching engagement with the carriage as shown in FIGURE 4, a finger 118 secured to the latch lever being engageable with the wall member 82 of the housing as shown in FIGURE 6 to limit counterclockwise rotation of the latch lever under the influence of the torsion spring means. The torsion spring means 116 is yieldable to permit clockwise rotation of the latch lever from the position of FIGURE 4 to the position of FIGURE 5 to unlatch the carriage 88 as will now be explained.

A mounting member 120 is secured between the side walls 94 of the carriage and includes a stepped bore 122 defining a shoulder 124 coaxial with the opening 92 in the base wall of the carriage. A compaction and ejection plunger comprises a head member 126 secured to one end of a rod 128 slidably disposed within the stepped bore 122 and including a smaller head member 130 at the other end thereof. A bracket member 132 is suitably rigidly secured flush with the head member 126 as by the fastener indicated in dotted lines in FIGURE 4, and includes a short ejection finger 134 radially spaced from the axis of the rod 128 and extending parallel thereto in substantial alignment with the die plate 68 in the positions of FIGURES 4 and 5, and an elongate orienting finger 136 radially opposite thereto and of sufficient length so as to be at all times confined between the side walls 94 of the carriage. Thus, the orienting finger at all times prevents extreme rotation of the compaction and ejection plunger within stepped bore 122 so as to maintain the ejecting finger 134 substantially directly opposite the opening 84 in wall member 82 of the housings 78. A coiled spring 138 surrounds the mounting member 120 and the plunger rod 128 and coacts between the bracket member 132 and the base wall 90 of the carriage so as to continuously urge the plunger to an extreme projected position relative to the carriage 88 as limited by abutment of the smaller head member 130 with the shoulder 124 as indicated in FIGURES 4 and 6, but being yieldable to permit reciprocation of the plunger to the retracted position illustrated in FIGURE 5 in which the smaller head member 130 projects through opening 92, engages the latch lever 104 and moves the latter from latching engagement with the carriage.

As the rollers 64 rotate within the wafering chamber, hay is continuously compressed and forced into and through the respective die cells 76 to form columns of hay as indicated at 140 in FIGURES 4 and 5 extending between the path of rotation of the rollers and the bracket member 132 with the ejection finger 134 thereof engaging a side of the column. The rollers continuously force new hay into the entrance ends of the die cells so as to continuously force the columns of hay against the bracket member 132. As a result of this process, the hay within each die cell is axially compacted into columns of substantially uniform quality, constituency, shape and density as the spring 138 is gradually overcome and the compaction and ejection plunger reciprocated from the position of FIGURE 4 to that of FIGURE 5.

At this time, the smaller head member 130 of the plunger rod 128 engages or triggers the latch lever 104; that is, disengages the latter from the carriage 88 which rapidly rotates from the position of FIGURE 5 to substantially that shown in FIGURE 6 due to the immediate expansion and reaction of the spring 138 between the bracket member 132 and the base wall 90 of the carriage. Due to the arcuate movement of the carriage 88 swinging the plunger and the ejecting finger 134 carried thereby to a position angularly related to the axes of the respective die cells and the columns of hay 140 therein, a wafer 142 of hay shears or breaks from the columns substantially at the exit ends of the respective die cells as indicated particularly in FIGURE 6. During this action, the spring 138 is expanding rapidly as aforementioned to ultimately dispose the compaction and ejection plunger in its extreme extended position relative to the carriage and as illustrated in FIGURES 4 and 6, resulting in rapid ejection of the wafers 142 through the openings 84 in the wall members 82 of the housings 78. In this regard, it will be appreciated that the relative dimensions and dispositions of the various parts of the compaction and ejecting mechanism 86 described above is such as to provide for a predetermined amount of reciprocable retraction of the compaction plunger within its mounting member 120 prior to disengaging or triggering the latch lever 104, thereby determining the length of the wafer to be broken from each column and resulting in successive wafers being of substantially uniform length as well as of substantially uniform quality, constituency, shape and density.

Upon disengagement of the latch lever 104, the finger 118 thereof will engage the wall member 82 of the housing to place the inclined cam surface 110 of the latch lever in a cocking position relative to the base wall 90 of the carriage. Upon triggering of the latch lever and during ejection of a wafer as aforedescribed, not only does the spring 138 expand to dispose the compaction plunger in its extreme extended position relative to the carriage but also the torsion spring means 100 acts to return the carriage to the positions of FIGURES 4 and 5. As the carriage so returns from the position of FIGURE 6, the base wall thereof cams against the inclined cam surface 110 of the latch lever which rotates sufficiently clockwise in FIGURE 6 to permit passage of the carriage followed by relatching of the lever with the carriage as illustrated in FIGURE 4. The compaction and ejection cycle then begins again.

The wafers 142 are ejected from the housings 78 into the enlarged housing member 56 and fall upon an elevator type conveyor 144 in the bottom thereof which includes belt means 146 equipped with spaced conveyor paddles 148 which pick up the wafers and convey them from the apparatus preferably into a trailing conveyance. The elevator type conveyor is preferably coupled to the power plant or engine 22 for drive thereof through a pulley 150 secured to one extreme end of the drive shaft 46 and connected through a belt 152 to a pulley 154 in turn connected through belt 156 to pulley 158 connected to the conveyor belt drive cog 160.

From the foregoing description, it will now be apparent that the homogenized mixture of hay including chopped, finely blended and mixed stems and leaves is delivered through the chute 36 to the hopper 38 and fed therefrom into the wafering chamber 54 by the feeding and centrifugal action of the auger 58. The deflector vanes 60 lay such hay along the entrance ends of the respective die cells 76 and the rollers 64 following the vanes compress and force the collection of hay into and through the die cells against the compaction and ejection mechanism 86 to form compacted, dense columns of hay which are then broken into wafers of substantially uniform length and ejected into the housing member 56 onto the elevator type conveyor 144 for disposal as desired.

The embodiments of the invention in which an exclusive property or privilege is claimed are defined as follows:

1. In an apparatus for making compressed hay wafers, said apparatus being of the type having an annular series of axially open radially extending die cells each including axially spaced entrance and exit ends with the entrance ends thereof arranged about a rotary compression means for successively applying force to hay disposed opposite the entrance ends of said die cells to compress a column of hay into and through said die cells; the improvement comprising means axially engageable with the columns of hay emerging from the exit ends of said die cells to axially compact said columns and form the latter into compressed wafers of hay as said force is applied, said means engageable with the columns of hay comprising a carriage pivotally mounted adjacent the exit end of each die cell, a compaction plunger reciprocably mounted on said carriage, yieldable spring means continuously urging said plunger to an extended position projecting from said carriage and being yieldable in response to reciprocation of said plunger to a retracted position on said carriage, and means normally holding said carriage in a first position in which said plunger is axially aligned with said die cell at the exit end thereof for engagement with the column of hay emerging therefrom and being operable in response to reciprocation of said plunger to a predetermined retracted position to permit pivotal movement of said carriage to a second position in which said plunger extends at an angle to the axis of said die cell to break and eject wafers of substantially uniform length from said column, said last-named means comprising latch means pivotally mounted adjacent said carriage and engageable therewith in said first position thereof, said plunger in its predetermined retracted position being engageable with said latch means to disengage the latter from said carriage for movement thereof to said second position.

2. In an apparatus for making compressed hay wafers, said apparatus being of the type having an annular series of axially open radially extending die cells each including axially spaced entrance and exit ends with the entrance ends thereof arranged about a rotary compression means for successively applying force to hay disposed opposite the entrance ends of said die cells to compress a column of hay into and through said die cells; the improvement comprising means axially engageable with the columns of hay emerging from the exit ends of said die cells to axially compact said columns and form the latter into compressed wafers of hay as said force is applied, said means engageable with the columns of hay comprising a carriage pivotally mounted adjacent the exit end of each die cell, a compaction plunger reciprocably mounted on said carriage, first yieldable spring means acting between said carriage and plunger and continuously urging the latter to an extended position projecting from said carriage and being yieldable in response to reciprocation of said plunger to a predetermined retracted position on said carriage, second yieldable spring means continuously urging pivotal movement of said carriage to a first position in which said plunger is axially aligned with said die cell at the exit end thereof for engagement with the column of hay emerging therefrom and being yieldable in response to pivotal movement of said carriage to a second position in which said plunger extends at an angle to the axis of said die cell, latch means pivotally mounted adjacent said carriage, and third yieldable spring means continuously urging pivotal movement of said latch means toward engagement with said carriage in said first position thereof and being yieldable to permit disengagement of said latch means from said carriage, said plunger being reciprocable to its predetermined retracted position by the column of hay emerging from the exit end of said die cell and in its predetermined retracted position being engageable with said latch means to disengage the latter from said carriage, whereby said first yieldable spring means pivots said carriage to its second position and wafers of compressed hay of substantially uniform length are broken from said column and ejected to one side of the axis of said die cell.

3. The apparatus according to claim 2 further comprising a housing communicating with the exit end of each of said die cells, said carriage and latch means associated with each of said die cells being mounted within said housing, and means defining an opening in said housing through which said wafers are ejected.

4. The apparatus according to claim 3 further comprising conveyor means receiving said ejected wafers from all of said housings and conveying same from said apparatus.

References Cited by the Examiner
UNITED STATES PATENTS

| | | |
|---|---|---|
| 752,644 | 2/1904 | Benson et al. |
| 1,163,448 | 12/1915 | Penkala _____ 100—147 |
| 1,881,171 | 10/1932 | Cooley _____ 107—14.5 |
| 2,384,163 | 9/1945 | Flowers. |
| 2,393,130 | 1/1946 | Toulmin. |
| 2,427,644 | 9/1947 | Field _____ 18—12 |
| 2,642,643 | 6/1953 | Montague _____ 25—14 |
| 2,798,444 | 7/1957 | Meakin _____ 18—15 |
| 2,996,756 | 8/1961 | Korsch et al. _____ 18—5 |
| 3,070,003 | 12/1962 | Stacy _____ 100—218 X |

FOREIGN PATENTS

| | | |
|---|---|---|
| 1,120,157 | 4/1956 | France. |
| 1,250,174 | 11/1960 | France. |

LOUIS O. MAASSEL, *Primary Examiner.*

CHARLES A. WILLMUTH, WALTER A. SCHEEL, *Examiners.*

B. J. WILHITE, *Assistant Examiner.*